United States Patent

Erdtmann et al.

[11] Patent Number: 6,020,398
[45] Date of Patent: Feb. 1, 2000

[54] PIGMENTED INK JET INKS FOR POLY (VINYLALCOHOL) RECEIVERS

[75] Inventors: David Erdtmann; Charles E. Romano; Thomas W. Martin; Joe E. Maskasky, all of Rochester, N.Y.

[73] Assignee: Eastman Kodak Company, Rochester, N.Y.

[21] Appl. No.: 09/083,869

[22] Filed: May 22, 1998

[51] Int. Cl.[7] .......................... C09D 11/02; B32B 27/18; B32B 7/02
[52] U.S. Cl. ........................ 523/160; 106/31.6; 428/524; 347/100
[58] Field of Search ..................... 523/160, 161; 106/31.6, 31.75; 428/524, 689, 195, 323.1

[56] References Cited

U.S. PATENT DOCUMENTS

| | | |
|---|---|---|
| 2,059,817 | 11/1936 | Sheppard et al. . |
| 2,992,109 | 7/1961 | Allen . |
| 2,994,611 | 8/1961 | Heyna et al. . |
| 3,232,763 | 2/1966 | Burnes . |
| 3,304,179 | 2/1967 | Field et al. . |
| 3,360,372 | 12/1967 | Burness et al. . |
| 3,490,911 | 1/1970 | Burness et al. . |
| 3,565,632 | 2/1971 | Mills et al. . |
| 3,635,718 | 1/1972 | Froehlich et al. . |
| 3,640,720 | 2/1972 | Cohen . |
| 3,642,486 | 2/1972 | Burness et al. . |
| 3,689,274 | 9/1972 | Sobel et al. . |
| 3,762,926 | 10/1973 | Himmelmann et al. . |
| 4,597,794 | 7/1986 | Ohta et al. . |
| 4,946,741 | 8/1990 | Aono et al. ............................. 428/336 |
| 4,954,477 | 9/1990 | Shuku et al. ............................. 503/226 |
| 5,085,698 | 2/1992 | Ma et al. . |
| 5,091,359 | 2/1992 | Ishida et al. ............................. 503/209 |
| 5,172,133 | 12/1992 | Suga et al. . |
| 5,276,001 | 1/1994 | Tsuchida et al. ....................... 503/210 |
| 5,418,078 | 5/1995 | Desie et al. ............................. 428/704 |
| 5,723,211 | 3/1998 | Romano et al. ....................... 428/328 |
| 5,853,470 | 12/1998 | Martin et al. ....................... 106/31.86 |
| 5,942,335 | 8/1999 | Chen et al. ............................. 428/500 |

OTHER PUBLICATIONS

The Theory of the Photographic Process, 4th Ed., T.H. James, 1977 Macmillan Publishing Co. pp. 77–87.
Research Disclosure, vol. 365, Sep. 1994, Item 36544, II, B. Hardeners.

*Primary Examiner*—Vasu Jagannathan
*Assistant Examiner*—Callie E. Shosho
*Attorney, Agent, or Firm*—Harold E. Cole

[57] ABSTRACT

Herein is disclosed a liquid ink jet ink for acetoacetylated poly(vinylalcohol) receivers comprising a carrier, a pigment and a hardener. A method of using the ink is also disclosed.

17 Claims, No Drawings

PIGMENTED INK JET INKS FOR POLY (VINYLALCOHOL) RECEIVERS

FIELD OF THE INVENTION

This invention relates to aqueous inks which utilize pigments as colorants and which are useful for ink jet printing applications. Specifically, this invention relates to the addition of hardeners to pigmented inks which improve the resistance of solid area patches printed on acetoacetylated poly(vinylalcohol) recording elements to being removed by water (waterfastness).

BACKGROUND OF THE INVENTION

The ink formulations of the present invention are employed in imaging processes which involve the application of liquid ink droplets in a pixel-by-pixel manner to an ink-receiving element. There are numerous schemes which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to the ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation.

The inks used in the various ink jet printers can be classified as either dye-based or pigment-based. A dye is a colorant which is molecularly dispersed or solvated by the carrier medium. The carrier medium can be a liquid or a solid at room temperature. A commonly use carrier medium is water or a mixture of water and organic cosolvents. Each individual dye molecule is surrounded by molecules of the carrier medium. In dye-based inks, no particles are observable under the microscope. Although there have been many recent advances in the art of dye-based ink jet inks, such inks still suffer from deficiencies such as low optical densities on plain paper and poor lightfastness. When water is used as the carrier medium, such inks also generally suffer from poor waterfastness.

Pigment-based inks have been gaining in popularity as a means of addressing these limitations. In pigment-based inks, the colorant exists as discrete particles. These pigment particles are usually treated with addenda known as dispersants or stabilizers which serve to keep the pigment particles from agglomerating and/or settling out. Pigment-based inks suffer from a different set of deficiencies than dye-based inks. One deficiency is related to the observation that pigment-based inks interact differently with specially coated papers and films, such as the transparent films used for overhead projection and the glossy papers and opaque white films used for high quality graphics and pictorial output. In particular, it has been observed that pigment-based inks produce imaged areas that are entirely on the surface of coated papers and films. This results in images which have poor dry and wet adhesion properties, resulting in images which can be easily smudged.

Commonly owned U.S. patent application Ser. No.08/847,858, filed Apr. 28, 1997, entitled "Pigmented Ink Jet Inks Containing Aldehydes" of Martin et al., and U.S. patent application Ser. No.08/896,520 filed Apr. 28, 1997, entitled "Pigmented Ink Jet Inks Containing Olefins" of Martin et al., disclose ink jet ink formulations containing compounds with aldehyde, blocked aldehyde and active olefinic functional groups. These references specify use of the inks on gelatin receivers.

What is needed in the art is a pigmented ink jet ink that will overcome the problems mentioned above when printed on acetoacetylated poly(vinylalcohol) (PVA) receivers. It has been unexpectedly found that when hardeners are used in conjunction with an ink-receiving layer containing acetoacetylated poly(vinylalcohol), superior wet abrasion resistance is obtained versus ink-receiving layers which are comprised of gelatin.

SUMMARY OF THE INVENTION

The present invention discloses a liquid ink jet ink for acetoacetylated poly(vinylalcohol) receivers comprising a carrier, a pigment and a hardener.

Also disclosed is a method of improving the stability of an ink jet ink image comprising the steps of:
a) providing an ink jet ink receiving layer containing acetoacetylated poly(vinylalcohol); and
b) depositing pigment-based ink jet ink to form an image on the acetoacetylated poly(vinylalcohol) containing ink receiving layer; wherein said pigment-based ink jet ink comprises a carrier, a pigment and a hardener.

In another embodiment, there is disclosed an ink jet printing method, comprising the steps of:
providing an ink jet printer that is responsive to digital data signals; loading the printer with ink receptive substrates containing acetoacetylated poly(vinylalcohol);
loading the printer with an ink jet ink comprising a carrier, a pigment and a hardener; and
printing on the ink receptive substrates in response to the digital data signals.

When inks of the present invention are printed onto an ink-receiving layer consisting of an acetoacetylated poly (vinylalcohol), the printed images are uniform, with crack-free text and solid area fills of high optical density. The images also exhibit excellent waterfastness and have superior wet adhesion properties versus an ink-receiving layer which is comprised of gelatin.

DETAILED DESCRIPTION OF THE INVENTION

For the practice of the present invention, useful hardeners are selected from aldehydes, active olefins, blocked aldehydes and blocked active olefins, and combinations thereof. Blocked hardeners are substances, usually derived from the active hardener, that release the active compound under appropriate conditions (The Theory of the Photographic Process, 4$^{th}$ Edition, T. H. James, 1977, Macmillan Publishing CO., page 81). For puposes of the present invention, hardeners are used at concentrations ranging from 0.10 to 5.0 weight percent of active ingredients in the pigmented ink, preferably at 0.25 to 2.0 weight percent.

Active olefinic compounds are defined as compounds having two or more olefinic bonds, especially unsubstituted vinyl groups, activated by adjacent electron withdrawing groups (The Theory of the Photographic Process, 4$^{th}$ Edition, T. H. James, 1977, Macmillan Publishing CO. page 82). Suitable compounds that contain active olefinic functional groups include divinyl ketone; resorcinol bis (vinylsulfonate); 4,6-bis(vinylsulfonyl)-m-xylene; bis (vinylsulfonylalkyl) ethers and amines; 1,3,5-tris (vinylsulfonyl) hexahydro-s-triazine; diacrylamide; 1,3-bis (acryloyl)urea; N,N'-bismaleimides; bisisomaleimides; bis (2-acetoxyethyl) ketone; 1,3,5-triacryloylhexahydro-s- triazine; and blocked active olefins of the type bis(2-acetoxyethyl) ketone and 3,8-dioxodecane-1,10-bis(pyridinium perchlorate).

Preferred are bis-(vinylsulfonyl)-methane (BVSM) and bis(vinylsulfonylmethyl) ether (BVSME).

Suitable aldehydes are selected from formaldehye and dialdehydes such as, an organic compound selected from formaldehyde, and the homologous series of dialdehydes ranging from glyoxal to adipaldehyde, diglycolaldehyde, and aromatic dialdehydes.

Preferred are formaldehyde, glutaraldehyde, succinaldehyde, and glyoxal. Suitable blocked aldehydes are selected from blocked dialdehydes and N-methylol compounds, such as 2,3-dihydroxy-1,4-dioxane (DHD); tetrahydro-4-hydroxy- 5-methyl-2(1H)-pyrimidinone polymers; polymers of the type having a glyoxal polyol reaction product consisting of 1 anhydroglucose unit: 2 glyoxal units; DME-Melamine non-formaldehyde resins; N-methylol compounds obtained from the condensation of formaldehyde with various aliphatic or cyclic amides, ureas, and nitrogen heterocycles.

Preferred is 2,3-dihydroxy-1,4-dioxane (DHD).

In the context of the present invention, hardening agents are defined as any additive which causes chemical cross-linking.

Inks useful for ink jet recording processes generally comprise at least a mixture of a solvent and a colorant. The preferred solvent is de-ionized water, and the colorant is either a pigment or a dye. Pigments are often preferred over dyes because they generally offer improved waterfastness and lightfastness on plain paper.

Pigmented inks are most commonly prepared in two steps:
1. a pigment milling step in which the as-received pigment is deaggregated into its primary particle size, and
2. a dilution step in which the pigment mill grind is converted into a useable ink.

Processes for preparing pigmented ink jet inks involve blending the pigment, an additive known as a stablizer or dispersant, a liquid carrier medium, grinding media, and other optional addenda such as surfactants and defoamers. This pigment slurry is then milled using any of a variety of hardware such as ball mills, media mills, high speed dispersers, and roll mills.

In the practice of the present invention, any of the known pigments can be used. The exact choice of pigment will depend upon the specific color reproduction and image stability requirements of the printer and application. For a list of pigments useful in ink jet inks, see U.S. Pat. No. 5,085,698, column 7, line 10 through column 8, line 48.

The liquid carrier medium can also vary widely and again will depend on the nature of the ink jet printer for which the inks are intended. For printers which use aqueous inks, water, or a mixture of water with miscible organic co-solvents, is the preferred carrier medium.

The dispersant is another important ingredient in the mill grind. Although there are many know dispersants known in the art, the best dispersant will be a function of the carrier medium and also often varies from pigment to pigment. Preferred dispersants for aqueous ink jet inks include sodium dodecyl sulfate, acrylic and styrene-acrylic copolymers, such as those disclosed in U.S. Pat. Nos. 5,085,698 and 5,172,133, and sulfonated styrenics, such as those disclosed in U.S. Pat. No. 4,597,794. Our most preferred dispersants are salts of oleyl methyl tauride.

In the dilution step, other ingredients are also commonly added to pigmented ink jet inks. Cosolvents are added to help prevent the ink from drying out or crusting in the orifices of the printhead or to help the ink penetrate the receiving substrate, especially when the substrate is a highly sized paper. Preferred cosolvents for the inks of the present invention are glycerol, ethylene glycol, propylene glycol, 2-methyl-2,4,-pentanediol, diethylene glycol, and mixtures thereof, at overall concentrations ranging from 5 to 20 wt % of the ink.

In the context of the present invention, an especially important additive is a hardener. Examples of such hardeners are: compounds containing an active olefinic functionality such as (BVSM), BVSME and the like; blocked aldehydes of the type tetrahydro-4-hydroxy-5-methyl-2 (1H)-pyrimidinone polymers (Sequa SUNREZ® 700), polymers of the type having a glyoxal polyol reaction product consisting of 1 anhydroglucose unit: 2 glyoxal units (SEQUAREZ® 755 obtained from Sequa Chemicals, Inc.), DME-Melamine non-fomaldehyde resins such as Sequa CPD3046-76 obtained from Sequa Chemicals Inc., 2,3-dihydroxy-1,4-dioxane (DHD), and the like, formaldehyde and compounds that contain two or more aldehyde functional groups such as glyoxal, formaldehyde, gluteraldehyde and the like.

Besides those already listed above, it is contemplated that other aldehyde containing compounds that are effective hardeners are also useful in the practice of this invention. Some compounds known to be effective hardeners are 3-hydroxybutyraldehyde (U.S. Pat. No. 2,059,817), crotonaldehyde, the homologous series of dialdehydes ranging from glyoxal to adipaldehyde, diglycolaldehyde (U.S. Pat. No. 3,304,179) various aromatic dialdehydes (U.S. Pat. Nos. 3,565,632 and 3,762,926), and polymeric dialdehydes such as dialdehyde starch and dialdehyde derivatives of plant gums. Most preferred are formaldehyde, glutaraldehyde, succinaldehyde, and glyoxal.

Likewise, it is also contemplated that other hardeners may be useful in the context of this invention. Some compounds known to be effective hardeners are blocked aldehydes such as 2,3-dihydroxy-1,4-dioxane (DHD), tetrahydro-4-hydroxy-5-methyl-2(1H)-pyrimidinone polymers, polymers of the type having a glyoxal polyol reaction product consisting of 1 anhydroglucose unit: 2 glyoxal units; DME-Melamine non-formaldehyde resins; N-methylol compounds obtained from the condensation of formaldehyde with various aliphatic or cyclic amides, ureas, and nitrogen heterocycles. Most preferred is 2,3-dihydroxy-1,4-dioxane (DHD) at concentrations ranging from 0.10 to 5.0 weight percent of active ingredient in the solution.

It is contemplated that compounds with active olefinic functionality that are effective hardeners are also useful in the practice of this invention. Some compounds known to be effective hardeners are divinyl ketone, resorcinol bis (vinylsulfonate) (U.S. Pat. No. 3,689,274), 4,6-bis (vinylsulfonyl)-m-xylene (U.S. Pat. No. 2,994,611), bis (vinylsulfonylalkyl) ethers and amines (U.S. Pat. Nos. 3,642,486 and 3,490,911), 1,3,5-tris(vinyisulfonyl) hexahydro-s-triazine, diacrylamide (U.S. Pat. No. 3,635, 718), 1,3-bis(acryloyl)urea (U.S. Pat. No. 3,640,720), N,N'-bismaleimides (U.S. Pat. No. 2,992,109) bisisomaleimides (U.S. Pat. No. 3,232,763), bis(2-acetoxyethyl) ketone (U.S. Pat. No. 3,360,372), and 1,3,5-triacryloylhexahydro-s-triazine. Blocked active olefins of the type bis(2-acetoxyethyl) ketone and 3,8-dioxodecane-1,10-bis (pyridinium perchlorate) may also be used. Most preferred is BVSM and BVSME at concentrations ranging from 0.10 to 5.0 weight percent of active ingredient in the solution. Other compounds which may act as hardeners include:

acetylenes, azides, aziridines, carboxylic acid derivatives such as epoxides such as glycidyl ethers and glycidylammonium salts, active halogen compounds, isocyanate adducts, diketones, methylol melamines, oxazolines, organometallics such as Volan™ (a complex of methylacrylic acid and chromium III) chloride, mucochloric acid, and polymeric hardeners.

In addition, there may be a synergistic effect from certain combinations of the above mentioned hardeners.

Additional related hardeners can be found in, The Theory of the Photographic Process, 4th Edition, T. H. James, 1977, Macmillan Publishing CO. pages 77–87, and in *Research Disclosure*, Vol. 365, September 1994, Item 36544, II, B. Hardeners.

A biocide (Proxel GXL™ (1,2-benzisothiazolin-3-one) at 0.0001–1.0 wt % of the ink) may be added to prevent unwanted microbial growth which may occur in the ink over time. A preferred biocide for the inks of the present invention is Proxel GXL™ (obtained from Zeneca Colours) at a final concentration of 0.005–0.5 wt %. of ink.

Additional additives which may optionally be present in ink jet inks include thickeners, conductivity enhancing agents, anti-kogation agents, drying agents, and defoamers.

EXAMPLES

Examples of Olefins (OLF)

OLF Comparative Example 1A

| Mill Grind | |
|---|---|
| Polymeric beads, mean diameter of 50 μm (milling media) | 325.0 g |
| Black Pearls 880 (Cabot Chemical Company) (pigment black 7) | 30.0 g |
| Oleoyl methyl taurine, (OMT) sodium salt | 10.5 g |
| Deionized water | 209.5 g |
| Proxel GXL™ (biocide from Zeneca) | 0.2 g |

The above components were milled using a high energy media mill manufactured by Morehouse-Cowles Hochmeyer. The mill was run for 8 hours at room temperature. An aliquot of the above dispersion to yield 1.12 g pigment was mixed with 2.50 g diethylene glycol, 2.50 g glycerol, and additional deionized water for a total of 50.0 g. This ink was filtered through 3-μm filter and introduced into an empty Hewlett-Packard 51626A print cartridge. Images were made with a Hewlett-Packard DeskJet™ 540 printer on medium weight resin coated paper containing an imaging layer.

The resin coated paper stock had been previously treated with a corona discharge treatment (CDT) and coated with an imaging layer consisting of about 800 mg/ft$^2$ of an acetoacetylated poly(vinylalcohol) (Gohsefimer Z-200, Nippon Gohsei). Poor waterfastness and wet adhesion were observed.

OLF Comparative Examples 1B–1D

Inks were prepared in a similar manner as described in OLF Comparative Example 1A except, the black pigment was replaced by a quinacridone magenta (pigment red 122) from Sun Chemical Co., Hansa Brilliant Yellow (pigment yellow 74) from Hoechst Chemical Co. or bis (phthalocyanylalumino)tetra-phenyldisiloxane (cyan pigment) manufactured by Eastman Kodak. The inks were printed as in OLF Comparative Example 1A and poor waterfastness and wet adhesion were observed in each sample.

OLF Example 2

An ink was prepared in the same manner as that described in OLF Comparative Example 1D, except 13.89 g of 1.8 wt % solution of BVSM was added to the mixture to obtain a final BVSM concentration of 0.50 wt % of hardener in the ink. This was printed onto coatings of paper stock which had previously been corona discharge treated (CDT) and which had been coated with an imaging layer consisting of about 800 mg/ft$^2$ of an acetoacetylated poly(vinylalcohol) (Gohsefimer Z-200, Nippon Gohsei). The image exhibited excellent waterfastness and good wet adhesion properties.

OLF Example 3

An ink was prepared in the same manner as that described in OLF Example 2, except 27.78 g of 1.8 wt % solution of BVSM was added to the mixture to obtain a final BVSM concentration of 1.00 wt % of hardener in the ink. This was printed onto coatings of paper stock which had previously been corona discharge treated (CDT) and which had been coated with an imaging layer consisting of about 800 mg/ft$^2$ of an acetoacetylated poly(vinylalcohol) (Gohsefimer Z-200, Nippon Gohsei). The image exhibited excellent waterfastness and excellent wet adhesion properties.

OLF Example 4

An ink was prepared in the same manner as that described in OLF Comparative Example ID, except 12.50 g of 2.0 wt % solution of BVSME was added to the mixture to obtain a final BVSME concentration of 0.50 wt % of hardener in the ink. This was printed onto coatings of paper stock which had previously been corona discharge treated (CDT) and which had been coated with an imaging layer consisting of about 800 mg/ft$^2$ of an acetoacetylated poly(vinylalcohol) (Gohsefimer Z-200, Nippon Gohsei). The image exhibited good waterfastness and fair wet adhesion properties.

OLF Example 5

An ink was prepared in the same manner as that described in OLF Comparative Example 1D, except 25.00 g of 2.0 wt % solution of BVSME was added to the mixture to obtain a final BVSME concentration of 1.00 wt % of hardener in the ink. This was printed onto coatings of paper stock which had previously been corona discharge treated (CDT) and which had been coated with an imaging layer consisting of about 800 mg/ft$^2$ of an acetoacetylated poly(vinylalcohol) (Gohsefimer Z-200, Nippon Gohsei). The image exhibited good waterfastness and good wet adhesion properties.

Ink Characterization

The images printed from the examples were evaluated by measuring the optical densities in three area patches with maximum ink coverage, and averaging, using an X-Rite™ Photographic Densitometer.

Waterfastness was determined by immersing samples of printed images in distilled water for 1 hour and then allowed to dry for at least 12 hours. The optical density was measured before immersion in water and after immersion in water and drying. Waterfastness is determined as the per cent of retained optical density after immersion in water and drying. After the samples had been immersed in water for half an hour the samples were physically rubbed to ascertain if the pigmented ink image would rub off with pressure (wet adhesion). They were subjectively rated based on the following scale: excellent=no discernable difference in image density or appearance, good=moderate density loss, fair= image rubs off easily, and poor=image floats off surface of paper while immersed in water.

TABLE 1

Olefin Examples
Results obtained from OLF Comparative Examples 1A–1D and
Examples 2–5 are summarized in the following Table 1.

| Example | Receiver | Pigment | % Pigment | Additive | Density Before | Density After | % Retained Density | Wet Adhesion |
|---|---|---|---|---|---|---|---|---|
| OLF Comp. 1A | Z-200 | p.b. 7 | 2.25 | none | 1.91 | .04 | 2 | Poor |
| OLF Comp. 1B | Z-200 | p.r. 122 | 2.6 | none | 1.73 | .05 | 3 | Poor |
| OLF Comp. 1C | Z-200 | p.y. 74 | 2.25 | none | 1.84 | .01 | 0 | Poor |
| OLF Comp. 1D | Z-200 | cyan | 2.25 | none | 1.71 | .07 | 4 | Poor |
| OLF 2 | Z-200 | cyan | 2.25 | BVSM | 1.97 | 1.69 | 86 | Good |
| OLF 3 | Z-200 | cyan | 2.25 | BVSM | 1.70 | 1.62 | 95 | Excellent |
| OLF 4 | Z-200 | cyan | 2.25 | BVSME | 2.09 | 1.25 | 60 | Fair |
| OLF 5 | Z-200 | cyan | 2.25 | BVSME | 1.97 | 1.60 | 81 | Good |

OLF = olefin; p.b. = pigment black; p.r. = pigment red; p.y. = pigment yellow; Z-200 = acetoacetylated poly(vinylalcohol) (Gohsefimer Z-200, Nippon Gohsei); BVSM = bis-(vinylsulfonyl)-methane; BVSME = bis-(vinylsulfonyl)methyl ether The results indicate that significant enhancement of the waterfastness and wet adhesion properties of printed images, printed on acetoacetylated poly(vinylalcohol), can be achieved with the addition of an active olefin such as bis-(vinylsufonyl-methyl) ether, bis-(vinylsulfonyl)-methane- to the ink jet ink. It has been unexpectedly found that when active olefins are used in conjunction with an ink-receiving layer containing an acetoacetylated poly (vinylalcohol), superior wet abrasion resistance is obtained versus an ink-receiving layer which is comprised of gelatin.

Examples of Blocked Aldehydes (BALD)

BALD Comparative Example 1A

This example was prepared as described above for OLF Comparative Example 1A.

The resin coated paper stock had been previously treated with a corona discharge treatment (CDT) and coated with an imaging layer consisting of about 800 mg/ft$^2$ of an acetoacetylated poly(vinylalcohol) (Gohsefimer Z-200, Nippon Gohsei). Poor waterfastness and wet adhesion were observed.

BALD Comparative Examples 1B–1D

Inks were prepared in a similar manner as described in BALD Comparative Example 1A except, the black pigment was replaced by a quinacridone magenta (pigment red 122) from Sun Chemical Co., Hansa Brilliant Yellow (pigment yellow 74) from Hoechst Chemical Co. or bis (phthalocyanylalumino)tetra-phenyldisiloxane (cyan pigment) manufactured by Eastman Kodak. The inks were printed as in BALD Comparative Example 1A and poor waterfastness and wet adhesion were observed in each sample.

BALD Comparative Example 2

An ink was prepared in the same manner as that described in BALD Comparative Example 1D except, 1.09 g of 55 wt % solution of a glyoxal polyol reaction product consisting of 1 anhydroglucose unit: 2 glyoxal units (SEQUAREZ® 755 obtained from Sequa Chemicals, Inc.) was added to the mixture to obtain a final concentration of 1.20 wt % of hardener in the ink. This ink was printed on resin coated paper stock which had been previously treated with a corona discharge treatment (CDT) and coated with an imaging layer consisting of about 800 mg/ft$^2$ of gelatin. Poor waterfastness and wet adhesion were observed.

BALD Comparative Examples 3A–3D

Inks were prepared in the same manner as that described in BALD Comparative Examples 1A–1D, except 1.10 g of 45 wt % solution of a cyclic urea glyoxal condensate consisting of 1 cyclic urea unit: 1 glyoxal units (SUNREZ® 700 obtained from Sequa Chemicals, Inc.) was added to the mixtures to obtain final hardener concentrations of 1.00 wt % of hardener in the inks. These inks were printed on resin coated paper stock which had been previously treated with a corona discharge treatment (CDT) and coated with an imaging layer consisting of about 800 mg/ft$^2$ of gelatin. Poor waterfastness and wet adhesion were observed.

BALD Comparative Example 4

An ink was prepared in the same manner as that described in BALD Example 3A, except that the SUNREZ® 700 was replaced with 5.00 g of 10 wt % solution of 2,3-dihydroxy-1,4-dioxane (DHD) obtained from Aldrich to obtain a final hardener concentration of 1.00 wt % of hardener in the ink. This ink was printed on resin coated paper stock which had been previously treated with a corona discharge treatment (CDT) and coated with an imaging layer consisting of about 800 mg/ft$^2$ of gelatin. It was observed that the $D_{max}$ image had excellent waterfastness, yet fair wet adhesion properties.

BALD Examples 5–7

Inks were prepared in the same manner as that described in BALD Comparative Example 1A, except SEQUAREZ® 755 was added at 0.30 (BALD Example 5), 1.20 (BALD Example 6), and 4.80 wt % of hardener in the ink (BALD Example 7) to an ink containing 3.50 wt % of pigment. These inks were printed on resin coated paper stock which had been previously treated with a corona discharge treatment (CDT) and coated with an imaging layer consisting of about 800 mg/ft$^2$ of an acetoacetylated poly(vinylalcohol) (Gohsefimer Z-200, Nippon Gohsei). Excellent waterfastness and wet adhesion were observed in each sample.

BALD Examples 8–10

Inks were prepared in the same manner as that described in BALD Comparative Example 1A, except the SEQUAREZ® 755 was replaced with SUNREZ® 700, added at 0.30 (BALD Example 8), 1.20 (BALD Example 9), and 4.80 wt % of hardener in the ink (BALD Example 10) to an ink containing 3.50 wt % of pigment. These inks were printed on resin coated paper stock which had been previously treated with a corona discharge treatment (CDT) and coated with an imaging layer consisting of about 800 mg/ft² of an acetoacetylated poly(vinylalcohol) (Gohsefimer Z-200, Nippon Gohsei). Excellent waterfastness and wet adhesion were observed in each sample.

BALD Examples 11–13

Inks from BALD Comparative Examples 3A–3C were printed on resin coated paper stock which had been previously treated with a corona discharge treatment (CDT) and coated with an imaging layer consisting of about 800 mg/ft² of an acetoacetylated poly(vinylalcohol)(Gohsefimer Z-200, Nippon Gohsei). Excellent waterfastness and wet adhesion were observed in each sample.

BALD Example 14

The ink from BALD Comparative Example 4 was printed on resin coated paper stock which had been previously treated with a corona discharge treatment (CDT)and coated with an imaging layer consisting of about 800 mg/ft² of an acetoacetylated poly(vinylalcohol)(Gohsefimer Z-200, Nippon Gohsei). Excellent waterfastness and wet adhesion were observed in each sample.

Ink Characterization

The images printed from the examples were evaluated by measuring the optical densities in three area patches with maximum ink coverage, and averaging, using an X-Rite™ Photographic Densitometer.

Waterfastness was determined as described above for the OLF Examples with Olefin.

SEQUAREZ® 755 to the inkjet ink. It has been unexpectedly found that when blocked aldehydes are used in conjunction with an ink-receiving layer containing an acetoacetylated poly(vinylalcohol), superior wet abrasion resistance is obtained versus an ink-receiving layer which is comprised of gelatin.

Examples for Aldehydes (ALD)

ALD Comparative Example 1A

This example was prepared the same as above for Comparative Example 1A. Same as OLF Comparative Example 1A.

The resin coated paper stock had been previously treated with a corona discharge treatment (CDT) and coated with an imaging layer consisting of about 800 mg/ft² of an acetoacetylated poly(vinylalcohol) (Gohsefimer Z-200, Nippon Gohsei). Poor waterfastness and wet adhesion were observed.

ALD Comparative Examples 1B–1D

Inks were prepared in a similar manner as described in ALD Comparative Example 1A except, the black pigment was replaced by a quinacridone magenta (pigment red 122) from Sun Chemical Co., Hansa Brilliant Yellow (pigment yellow 74) from Hoechst Chemical Co. or bis (phthalocyanylalumino)tetra-phenyldisiloxane (cyan pigment) manufactured by Eastman Kodak. The inks were printed as in Comparative ALD Example 1A and poor waterfastness and wet adhesion were observed in each sample.

TABLE 2

Results for BALD Comparative Examples 1A–3D and BALD Examples 5–14 are summarized in the following Table 2.

| Example | Receiver | Pigment | % Pigment | Additive | Density Before | Density After | Wet Adhesion |
| --- | --- | --- | --- | --- | --- | --- | --- |
| BALD Comp. 1A | Z-200 | p.b. 7 | 2.25 | none | 1.91 | .04 | 2 Poor |
| BALD Comp. 1B | Z-200 | p.r. 122 | 2.6 | none | 1.73 | .05 | 3 Poor |
| BALD Comp. 1C | Z-200 | p.y. 74 | 2.25 | none | 1.84 | .01 | 0 Poor |
| BALD Comp. 1D | Z-200 | cyan | 2.25 | none | 1.71 | .07 | 4 Poor |
| BALD Comp. 2 | Gelatin | cyan | 2.25 | Sequa 755 | 1.84 | 0 | 0 Poor |
| BALD Comp. 3A | Gelatin | cyan | 2.25 | Sun 700M | 1.94 | 0 | 0 Poor |
| BALD Comp. 3B | Gelatin | p.r. 122 | 2.60 | Sun 700M | 1.72 | 0 | 0 Poor |
| BALD Comp. 3C | Gelatin | p.y. 74 | 2.25 | Sun 700M | 1.65 | 0 | 0 Poor |
| BALD Comp. 3D | Gelatin | p.b. 7 | 2.25 | Sun 700M | 2.39 | 0 | 0 Poor |
| BALD Comp. 4 | Gelatin | cyan | 2.25 | DHD | 1.88 | 1.77 | 94 Fair |
| BALD 5 | Z-200 | p.b. 7 | 3.50 | Sequa 755 | 2.40 | 2.03 | 85 Excellent |
| BALD 6 | Z-200 | p.b. 7 | 3.50 | Sequa 755 | 2.38 | 2.15 | 90 Excellent |
| BALD 7 | Z-200 | p.b. 7 | 3.50 | Sequa 755 | 2.43 | 2.10 | 86 Excellent |
| BALD 8 | Z-200 | p.b. 7 | 3.50 | Sun 700M | 2.32 | 1.95 | 84 Excellent |
| BALD 9 | Z-200 | p.b. 7 | 3.50 | Sun 700M | 2.44 | 1.75 | 72 Excellent |
| BALD 10 | Z-200 | p.b. 7 | 3.50 | Sun 700M | 1.94 | 1.65 | 85 Excellent |
| BALD 11 | Z-200 | Cyan | 2.25 | Sun 700M | 2.12 | 2.01 | 95 Excellent |
| BALD 12 | Z-200 | p.r. 122 | 2.60 | Sun 700M | 1.57 | 1.52 | 97 Excellent |
| BALD 13 | Z-200 | p.y. 74 | 2.25 | Sun 700M | 1.78 | 1.75 | 98 Excellent |
| BALD 14 | Z-200 | cyan | 2.25 | DHD | 2.30 | 2.21 | 96 Excellent |

BALD = Blocked Aldehydes; p.b. = pigment black; p.r. = pigment red; p.y. = pigment yellow; Z-200 = acetoacetylated poly(vinylalcohol); DHD = 2,3-dihydroxy-1,4-dioxane; Sun 700M = a cyclic urea glyoxal condensate consisting of 1 cyclic urea unit: 1 glyoxal units (SUNREZ ® 700 obtained from Sequa Chemicals, Inc.); Sequa 755 = a glyoxal polyol reaction product consisting of 1 anhydroglucose unit: 2 glyoxal units (SEQUAREZ ® 755 obtained from Sequa Chemicals, Inc.)

The results indicate that significant enhancement of the waterfastness and wet adhesion of printed images, printed on acetoacetylated poly(vinylalcohol), can be achieved with the addition of blocked aldehydes such as 2,3-dihydroxy-1, 4-dioxane (DHD), Sequa SUNREZ® 700, and Sequa ALD Comparative Examples 2A–2D Inks were prepared in the same manner as that described in ALD Examples 1A–1D, except that 0.38 g of 40 wt % solution of glyoxal obtained from Aldrich Chemicals was added to the mixture to obtain a final glyoxal concentration of 0.30 wt % of hardener in the ink. These inks were printed on resin coated paper stock which had been previously treated with a corona discharge treatment (CDT) and coated with an imaging layer consisting of about 800 mg/ft$^2$ of a non-modified poly(vinylalcohol) (Gohsefimer K-210, Nippon Gohsei). Poor waterfastness and wet adhesion were observed in each sample.

ALD Comparative Example 3

An ink was prepared in the same manner as that described in ALD Example 2D. This ink was printed on resin coated paper stock stock which had been previously treated with a corona discharge treatment (CDT) and coated with an imaging layer consisting of about 800 mg/ft$^2$ of gelatin. Poor waterfastness and wet adhesion were observed in each sample.

ALD Comparative Example 4

An ink was prepared in the same manner as that described in ALD Example 2D except the glyoxal was replaced with formaldehyde. To the ink 1.35g of 37 wt % solution of formaldehyde obtained from Aldrich Chemicals was added to obtain a final formaldehyde concentration of 1.0 wt % of hardener in the ink. This ink was printed on resin coated paper stock which had been previously treated with a corona discharge treatment (CDT) and coated with an imaging layer consisting of about 800 mg/ft$^2$ of gelatin. It was observed that the image exhibited excellent waterfastness, yet it had fair wet adhesion properties.

ALD Example 5

Ink from ALD Comparative Example 2A was printed onto coatings where the paper stock had been previously treated with a corona discharge treatment (CDT) and coated with an imaging layer consisting of about 800 mg/ft$^2$ of an acetoacetylated poly(vinylalcohol) (Gohsefimer Z-200, Nippon Gohsei). The image exhibited excellent waterfastness and wet adhesion properties.

ALD Examples 6–8

Inks were prepared in the same manner as that described in ALD Example 5, except that glyoxal was added at 0.60 (ALD Example 6), 1.20 (ALD Example 7), and 2.40 wt % of glyoxal in the ink (ALD Example 8). Images from these inks exhibited excellent waterfastness and wet adhesion at all concentrations of glyoxal.

ALD Examples 9–11

Inks were prepared in the same manner as that described in ALD Example 5, except that the pigment black 7 was replaced with pigment yellow 74, pigment red 122, or the cyan pigment. Images made with these inks exhibited excellent waterfastness and wet adhesion properties.

ALD Example 12

Ink from ALD Comparative Example 4 was printed onto coatings where the paper stock had been previously treated with a corona discharge treatment (CDT) and coated with an imaging layer consisting of about 800 mg/ft$^2$ of an acetoacetylated poly(vinylalcohol) (Gohsefimer Z-200, Nippon Gohsei). The image exhibited excellent waterfastness and wet adhesion properties.

Ink Characterization

The images printed from the examples were evaluated by measuring the optical densities in three area patches with maximum ink coverage, and averaging, using an X-Rite™Photographic Densitometer.

Waterfastness was determined by the method described above for the Olefinic OLF examples.

TABLE 3

Results from ALD Comparative Examples 1A–4 and Examples 5–12 are summarized in the following Table 3.

| Example | Receiver | Pigment | % Pigment | Additive | Density Before | Density After | % Retained Density | Wet Adhesion |
|---|---|---|---|---|---|---|---|---|
| ALD Comp. 1A | Z-200 | p.b. 7 | 2.25 | none | 1.91 | .04 | 2 | Poor |
| ALD Comp. 1B | Z-200 | p.r. 122 | 2.6 | none | 1.73 | .05 | 3 | Poor |
| ALD Comp. 1C | Z-200 | p.y. 74 | 2.25 | none | 1.84 | .01 | 0 | Poor |
| ALD Comp. 1D | Z-200 | cyan | 2.25 | none | 1.71 | .07 | 4 | Poor |
| ALD Comp. 2A | K-210 | p.b. 7 | 2.25 | glyoxal | 1.35 | .12 | 9 | Poor |
| ALD Comp. 2B | K-210 | p.r. 122 | 2.6 | glyoxal | 1.35 | .11 | 8 | Poor |
| ALD Comp. 2C | K-210 | p.y. 74 | 2.25 | glyoxal | 1.64 | .06 | 4 | Poor |
| ALD Comp. 2D | K-210 | cyan | 2.25 | glyoxal | 1.17 | .14 | 12 | Poor |
| ALD Comp. 3 | Gelatin | cyan | 2.25 | glyoxal | 1.98 | 0 | 0 | Poor |
| ALD Comp. 4 | Gelatin | cyan | 2.25 | FA | 1.72 | 1.50 | 87 | Fair |
| ALD 5 | Z-200 | p.b. 7 | 2.25 | glyoxal | 1.65 | 1.51 | 91 | Excellent |
| ALD 6 | Z-200 | p.b. 7 | 3.50 | glyoxal | 2.86 | 2.60 | 91 | Excellent |
| ALD 7 | Z-200 | p.b. 7 | 3.50 | glyoxal | 2.17 | 2.03 | 93 | Excellent |
| ALD 8 | Z-200 | p.b. 7 | 3.50 | glyoxal | 2.07 | 2.05 | 99 | Excellent |
| ALD 9 | Z-200 | p.y. 74 | 2.25 | glyoxal | 1.84 | 1.86 | 101 | Excellent |
| ALD 10 | Z-200 | p.r. 122 | 2.60 | glyoxal | 1.90 | 1.86 | 98 | Excellent |
| ALD 11 | Z-200 | cyan | 2.25 | glyoxal | 1.39 | 1.25 | 90 | Excellent |
| ALD 12 | Z-200 | cyan | 2.25 | FA | 1.72 | 1.50 | 87 | Excellent |

ALD - Aldehydes; p.b. = pigment black; p.r. = pigment red; p.y. = pigment yellow; Z-200 = acetoacetylated poly(vinylalcohol); K-210 = poly(vinylalcohol); FA= fonnaldehyde The results indicate that significant enhancement of the waterfastness and wet adhesion of printed images, printed onacetoacetylated poly(vinylalcohol), can be achieved with the addition of aldehydes such as formaldehyde and glyoxalto the inkjet ink. It has been unexpectedly found that when aldehydes are used in conjunction with an ink-receiving layer containing an acetoacetylated poly(vinylalcohol), superior wet abrasion resistance is obtained versus an ink-receiving layer which is comprised of gelatin.

The invention has been described in detail with particular reference to certain preferred embodiments thereof, but it will be understood that variations and modifications can be effected within the spirit and scope of the invention.

What is claimed:

1. A liquid ink jet ink comprising a carrier, a pigment and a hardener, wherein said hardener is suitable for use in conjunction with an ink-receiving layer containing acetoacetylated poly(vinylalcohol).

2. The liquid ink jet ink of claim 1 wherein the concentration of the hardener is in the solution is between 0.10 and 5.0 weight percent of active ingredients in the ink.

3. The liquid ink jet ink of claim 1 wherein the concentration of the hardener in the solution is between 0.25 and 2.0 weight percent of active ingredients in the ink.

4. The liquid ink jet ink of claim 1 wherein the hardener is selected from the group consisting of organic compounds with aldehyde functional groups, blocked aldehyde functional groups, and active olefinic functional groups and combinations thereof.

5. The liquid ink jet ink of claim 4 wherein the hardener is selected from the group consisting of formaldehyde and dialdehydes.

6. The liquid ink jet ink of claim 5 wherein the hardener is selected from the group consisting of the homologous series of dialdehydes ranging from glyoxal to adipaldehyde, diglycolaldehyde, and aromatic dialdehydes.

7. The liquid ink jet ink of claim 5 wherein the hardener is selected from the group consisting of glutaraldehyde, succinaldehyde, and glyoxal.

8. The liquid ink jet ink of claim 4 wherein the hardener is selected from the group consisting of blocked dialdehydes and N-methylol compounds.

9. The liquid ink jet ink of claim 8 wherein the hardener is selected from the group consisting of 2,3-dihydroxy-1,4-dioxane (DHD); tetrahydro-4-hydroxy-5-methyl-2(1H)-pyrimidinone polymers; polymers having a glyoxal polyol reaction product consisting of 1 anhydroglucose unit: 2 glyoxal units; DME-Melamine non-formaldehyde resins; N-methylol compounds obtained from the condensation of formaldehyde with various aliphatic or cyclic amides, ureas, and nitrogen heterocycles.

10. The liquid ink jet ink of claim 8 wherein the hardener is selected from the group consisting of 2,3-dihydroxy-1,4-dioxane (DHD).

11. The liquid ink jet ink of claim 4 wherein the hardener is selected from active olefins and blocked active olefins.

12. The liquid ink jet ink of claim 11 wherein the hardener is selected from the group consisting of divinyl ketone; resorcinol bis(vinylsulfonate); 4,6-bis(vinylsulfonyl)-m-xylene; bis(vinlyulfonylalkyl) ethers and amines; 1,3,5-tris(vinylsulfonyl)hexahydro-s-triazine; diacrylamide; 1,3-bis(acryloyl)urea; N,N'-bismaleimides; bisisomaleimides; 1,3,5-triacryloylhexahydro-s-triazine; and blocked active olefins of the type bis(2-acetoxyethyl) ketone and 3,8-dioxodecane-1,10-bis(pyridinium perchlorate).

13. The liquid ink jet ink of claim 12 wherein the hardener is selected from the group consisting of bis-(vinylsulfonyl)-methane (BVSM) and bis(vinylsulfonylmethyl) ether (BVSME).

14. The liquid ink jet ink of claim 1 wherein the pigment is selected from pigment black No. 7, pigment red No. 122, pigment yellow No. 74 and a bridged aluminum phthalocyanine pigment.

15. A method of improving the stability of an ink jet ink image comprising the steps of:

a) providing an ink jet ink receiving layer containing acetoacetylated poly(vinylalcohol); and b) depositing pigment-based ink jet ink to form an image on the acetoacetylated poly(vinylalcohol)-containing ink receiving layer;

wherein said pigment-based ink jet ink comprises a carrier, a pigment and a hardener.

16. An ink jet printing method, comprising the steps of:

providing an ink jet printer that is responsive to digital data signals;

loading the printer with ink receptive substrates containing acetoacetylated poly(vinylalcohol);

loading the printer with an ink jet ink comprising a carrier, a pigment and a hardener; and printing on the ink receptive substrates in response to the digital data signals.

17. The method described in claim 15 or 16 wherein the hardener is selected from the group consisting of organic compounds with aldehyde functional groups, blocked aldehyde functional groups, and active olefinic functional groups and combinations thereof.

* * * * *